(12) United States Patent
Schwarze et al.

(10) Patent No.: US 7,725,354 B2
(45) Date of Patent: May 25, 2010

(54) INTERFACE FOR GENERATING BUSINESS PARTNERS

(75) Inventors: Peter Schwarze, St. Leon-ROT (DE); Karin Brecht-Tillinger, Edingew-Neckarhausen (DE); Torsten Reichert, Malsch (DE)

(73) Assignee: SAP Aktiengesellschaft, Walldorf (DE)

( * ) Notice: Subject to any disclaimer, the term of this patent is extended or adjusted under 35 U.S.C. 154(b) by 992 days.

(21) Appl. No.: 10/676,378

(22) Filed: Sep. 30, 2003

(65) Prior Publication Data

US 2004/0133481 A1 Jul. 8, 2004

Related U.S. Application Data

(60) Provisional application No. 60/427,509, filed on Nov. 18, 2002.

(51) Int. Cl.
    *G06Q 30/00* (2006.01)
(52) U.S. Cl. .............................. 705/26; 705/1; 705/27; 707/513
(58) Field of Classification Search ................ 705/26, 705/27; 707/513
    See application file for complete search history.

(56) References Cited

U.S. PATENT DOCUMENTS

| | | | |
|---|---|---|---|
| 6,324,534 B1 | 11/2001 | Neal et al. | |
| 6,591,260 B1* | 7/2003 | Schwarzhoff et al. | 707/2 |
| 6,766,454 B1 | 7/2004 | Riggins | |
| 7,047,211 B1 | 5/2006 | Van Etten et al. | |
| 2001/0037415 A1* | 11/2001 | Freishtat et al. | 709/328 |
| 2002/0032665 A1* | 3/2002 | Creighton et al. | 705/76 |
| 2002/0099735 A1* | 7/2002 | Schroeder et al. | 707/513 |
| 2002/0107889 A1* | 8/2002 | Stone et al. | 707/513 |
| 2002/0133392 A1 | 9/2002 | Angel et al. | |
| 2002/0133395 A1* | 9/2002 | Hughes et al. | 705/11 |
| 2002/0138370 A1 | 9/2002 | Dan et al. | |
| 2003/0002526 A1 | 1/2003 | Dias et al. | |
| 2003/0033179 A1* | 2/2003 | Katz et al. | 705/7 |
| 2003/0046201 A1* | 3/2003 | Cheyer | 705/35 |
| 2003/0055652 A1* | 3/2003 | Nichols et al. | 704/275 |
| 2003/0144915 A1* | 7/2003 | Aupperle et al. | 705/26 |
| 2003/0163547 A1* | 8/2003 | Beisty et al. | 709/217 |
| 2003/0172007 A1* | 9/2003 | Helmolt et al. | 705/28 |

(Continued)

FOREIGN PATENT DOCUMENTS

EP 0697669 A2 2/1996

(Continued)

OTHER PUBLICATIONS

Easyask breaks the search barrier; early adopter is building a distributed e-commerce supplier network. Business Wire, Jul. 31, 2000.*

(Continued)

*Primary Examiner*—Jason Dunham
(74) *Attorney, Agent, or Firm*—Fish & Richardson P.C.

(57) ABSTRACT

An electronic procurement system may enable users, such as professional purchasers for an enterprise, to create new business partners for the enterprise using information in business partner directories hosted by external service providers. The electronic procurement system and external service providers may use a partner interface protocol to exchange partner information. The new business partner may be created during a business process using the partner information.

20 Claims, 7 Drawing Sheets

U.S. PATENT DOCUMENTS

| | | | |
|---|---|---|---|
| 2003/0177070 A1 | 9/2003 | Viswanath et al. | |
| 2003/0182392 A1 | 9/2003 | Kramer | |
| 2003/0191677 A1* | 10/2003 | Akkiraju et al. | 705/8 |
| 2004/0148232 A1 | 7/2004 | Fushimi et al. | |
| 2005/0209950 A1* | 9/2005 | Clark | 705/37 |
| 2005/0234888 A1 | 10/2005 | Bailey et al. | |
| 2006/0036463 A1* | 2/2006 | Patrick et al. | 705/1 |

FOREIGN PATENT DOCUMENTS

| | | |
|---|---|---|
| KR | 20020066719 A | 8/2002 |

OTHER PUBLICATIONS

Etzioni, O., "The World Wide Web: Quagmire or Gold Mine?" Communications of the ACM, vol. 39, No. 11, pp. 65-68, Nov. 1996.

Mendelson, E., "Innovative Software GMBh: Java Booster," PC Magazine, vol. 17, No. 6, p. 199, Mar. 24, 1998.

Anon., "Lexmark Joins E-Commerce Pilot to Give Customers Easier and Better Way to Compare Products on the Web," Business Wire, Jul. 27, 1998.

Dorobek, C., "Group Demos Way to Shop Multiple E-Catalogs," Government Computer News, vol. 17, No. 40, p. 8, Dec. 14, 1998.

Anon., "Intelisys Partners with Mercado Software to Offer Intuitive Search Across Multi-Supplier Catalogs without the Need for Normalization," Business Wire, p. 0143, May 15, 2000.

Anon., "EasyAsk Breaks the Search Barrier; Early Adopter is Building a Distributed E-Commerce Supplier Network," Business Wire Jul. 31, 2000.

Anon., "Easy Spirit Adopts e7th's Secure Online Wholesale Transaction Technology; Nine West's Largest Brand Becomes $34^{th}$ Retailer in e7th's Multi-vendor Catalog," Business Wire, Sep. 26, 2000.

Anon., "SPS Commerce Launches B-to-B Catalog Synchronization Capabilities to Increase Supply Chain Efficiencies," PR Newswire, Apr. 30, 2001.

Anon, "Convera and PartNET Selected by Department of Defense EMALL; Improved Site Eases Use by Providing Seven Advanced Search Options," Business Wire, Jun. 25, 2002.

\* cited by examiner

FIG. 3

| COMPONENT | COMPONENT TYPE |
|---|---|
| NAME1* | BU_NAMEOR1 |
| NAME2 | BU_NAMEOR2 |
| DUNS_NUMBER | BU_DUNS_NUMBER |
| EXT_PARTNER_ID | BU_ID_NUMBER |
| LANGUAGE *? | LAISO |
| STD_COMM_TYPE | BU_OPI_STD_COMM_TYPE |
| CO_NAME | AD_NAME_CO |
| CITY * | AD_CITY1 |
| DISTRICT | AD_CITY2 |
| POSTAL_CODE | AD_PSTCD1 |
| POSTL_COD_PO_BOX | AD_PSTCD2 |
| POSTL_COD_COMP | AD_PSTCD3 |
| PO_BOX | AD_POBX |
| PO_BOX_CITY | AD_POBXLOC |
| PO_BOX_COUNTRY | AD_POBXCTY |
| STREET_PREFIX | AD_STRSPP1 |
| STREET | AD_STREET |
| STREET_SUFFIX | AD_STRSPP3 |
| HOUSE_NUMBER | AD_HSNM1 |
| BUILDING | AD_BLDNG |
| FLOOR | AD_FLOOR |
| ROOM_NUMBER | AD_ROOMNUM |
| COUNTRY * | INTCA |
| TAX_JUR_CODE | AD_TXJCD |
| PHONE_NUMBER *? | AD_TLNMBR |
| PHONE_EXTENS | AD_TLXTNS |
| FAX_NUMBER | AD_FXNMBR |
| FAX_EXTENSION | AD_FXXTNS |
| EMAIL_ADDRESS * | AD_SMTPADR |
| ATTACHMENT_URL | BU_OPI_ATTACHMENT_URL |
| ATTACHMENT_TITEL | BU_OPI_ATTACHMENT_TITEL |
| .INCLUDE | CI_OPI_CUSTOMER_EXTENSION |

*FIG. 4*

INTERFACE FOR GENERATING BUSINESS PARTNERS

CROSS-REFERENCE TO RELATED APPLICATIONS

This application claims priority to U.S. Provisional Application Ser. No. 60/427,509, filed on Nov. 18, 2002, and entitled, "Web Service Integration".

BACKGROUND

The following description relates to electronic procurement systems.

Companies may employ certain individuals to purchase products and/or services for the company. These professional purchasers may need to identify a pool of potential business partners to supply a product or service and then select from that pool.

Professional purchasers may utilize electronic procurement systems to facilitate purchasing business processes. These systems may enable the company to reduce costs associated with purchasing by increasing supply chain visibility and automating business processes. Electronic procurement systems may also help the purchasers, and the company, build collaborative relationships with suppliers.

SUMMARY

A system may enable users, such as professional purchasers for an enterprise, to create new business partners for the enterprise using information in business partner directories hosted by external service providers. The system may include an electronic procurement system that can perform the following operations: establish communication with a server including an external directory; send a request identifying a user-selected potential business partner in the external directory; receive a response from the external directory; the response including information relating to the selected potential business partner; parse the information in the response; and create a new business partner entry in the internal directory with the information parsed from the response.

The electronic procurement system and external service providers may use a partner interface protocol to exchange partner information. The request and response may include information in a format compliant with the protocol.

The new business partner may be created during a business process using the partner information. The new business partner may be approved in another process. The system may determine whether the user has approval to create a new business partner. If not, an authorized approver may be identified, and a workflow item created for the authorized approver. If the new business partner is ultimately not approved, the new business partner may be deleted from the internal directory and any document created using the new business partner information may be placed on hold.

BRIEF DESCRIPTION OF THE DRAWINGS

FIG. 3 is a screen shot of a display in a sourcing application.

FIG. 4 shows an exemplary OPI outbound interface structure.

DETAILED DESCRIPTION

Figure 1:
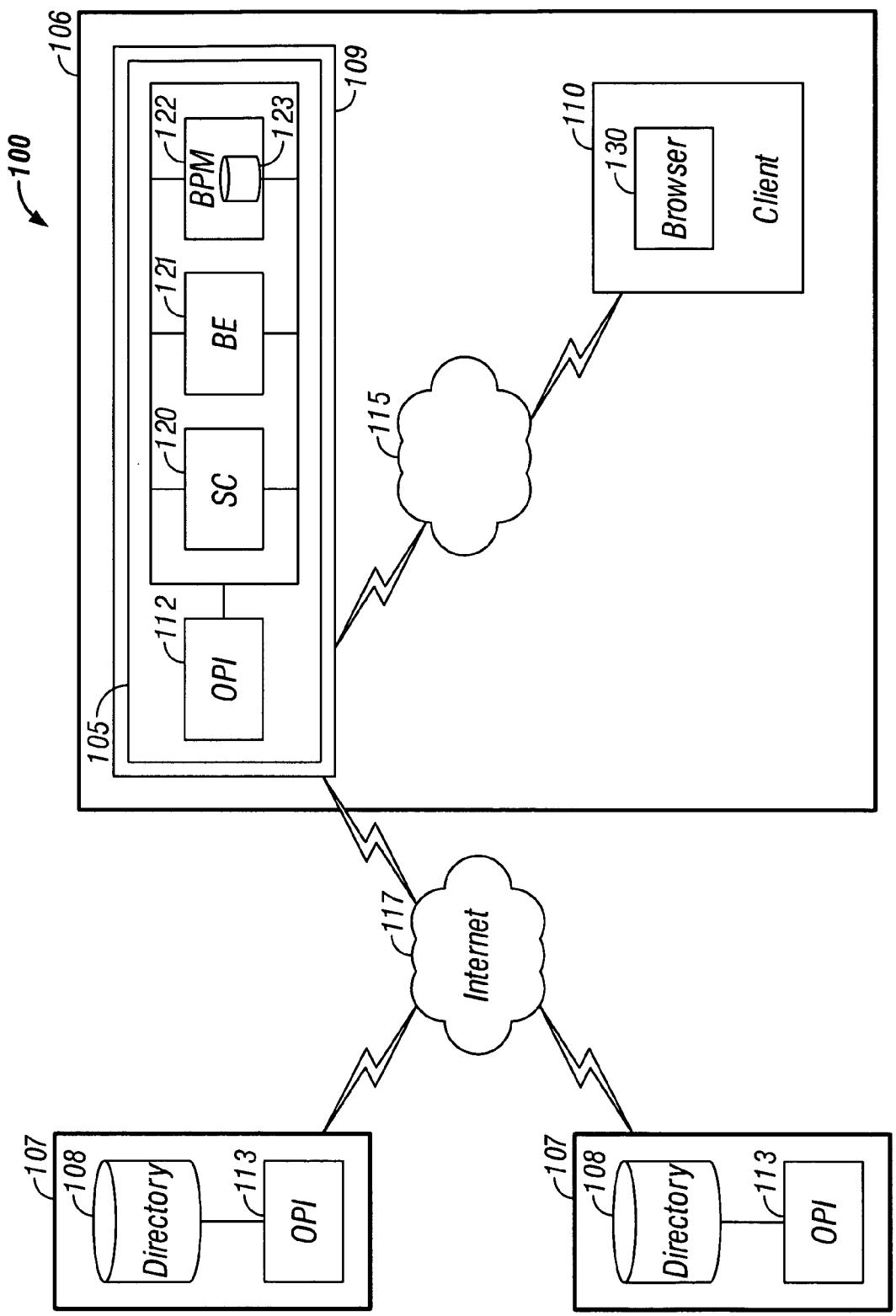
FIG. 1 is a block diagram of a system supporting a partner interface.

FIG. 1 shows a system 100 that includes an electronic procurement system 105 in an enterprise system 106 and one or more external service providers 107. The system may enable users of the electronic procurement system 105 to create business partners from an external business partner directory 108 hosted by an external service provider 107. The user may access the business partner directory 108 at the external service provider and create a business partner entry (or object) in the electronic procurement system during execution of a business process in the procurement system, e.g., assigning a source of supply (e.g., a vendor) for a product.

The enterprise system 106 may include one or more clients 110 connected to an application server 109 through a network 115, e.g., a LAN (Local Area Network), WAN (Wide Area Network), or Web portal. Users may interact with the application server 109 through the client 110, which may be, for example, a personal computer (PC) or a terminal connected directly to the application server 109.

The electronic procurement system 105 may reside on the application server 109. The electronic procurement system 105 may include a number of services that support interaction with business partners and/or maintenance of business partner information. The services may include a sourcing cockpit 120, a bidding engine 121, and a business partner maintenance service 122. The sourcing cockpit 120 may enable a user to search for and select a company approved vendor to source a particular product. The bidding engine 121 may enable the user to create bid invitations for an auction and host and participate in the auction. The business partner maintenance service 122 may enable the user to create new business partners and update existing business partner information. The business partner maintenance service 122 may include an internal business partner directory 123, which may include a list of company-approved vendors (flagged as "released") and/or vendors pending approval (flagged as "not_released") and backend contracts for certain products or product categories.

Figure 2A:
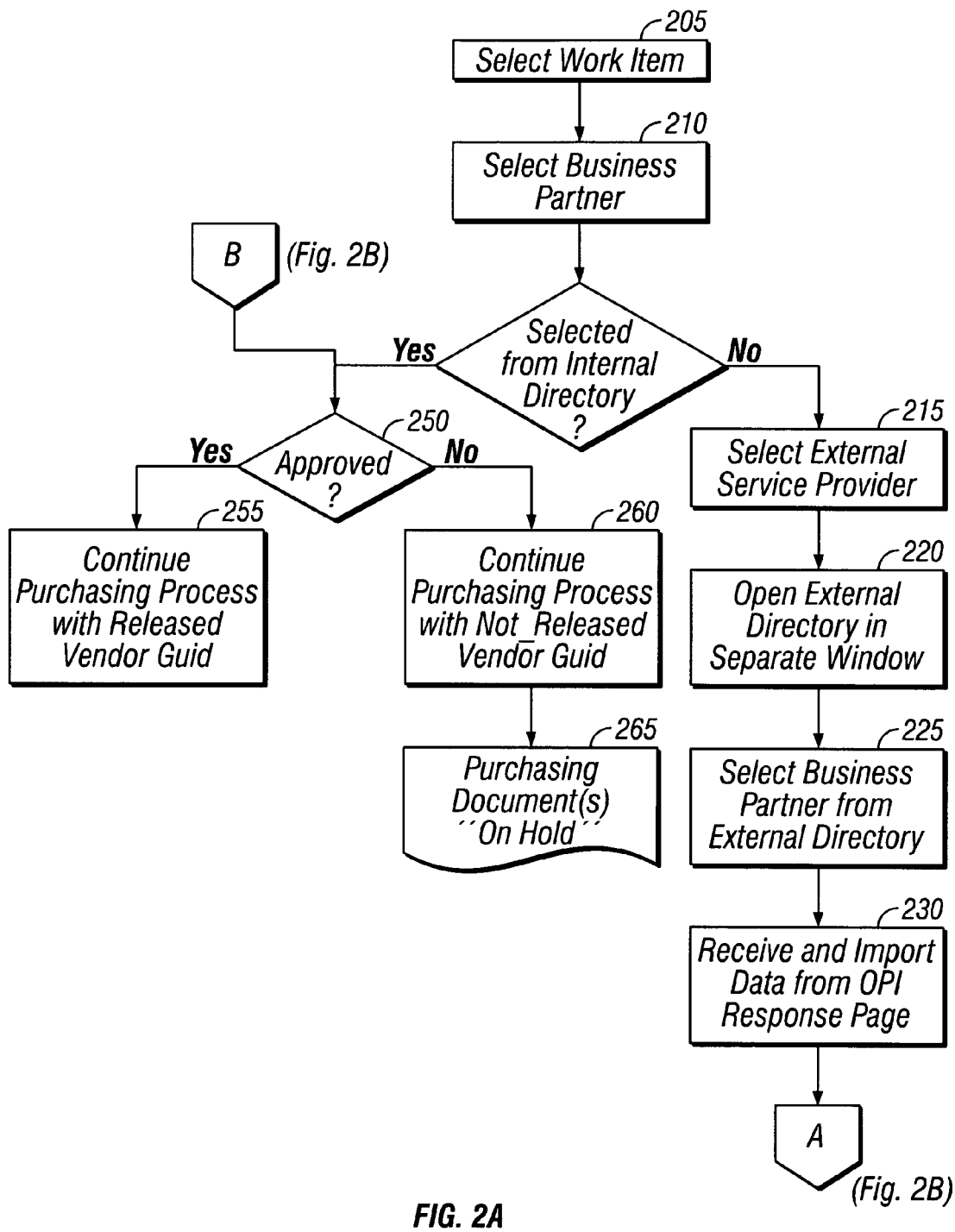
FIGS. 2A-2C show a flowchart describing a business partner creation operation.
Figure 2B:
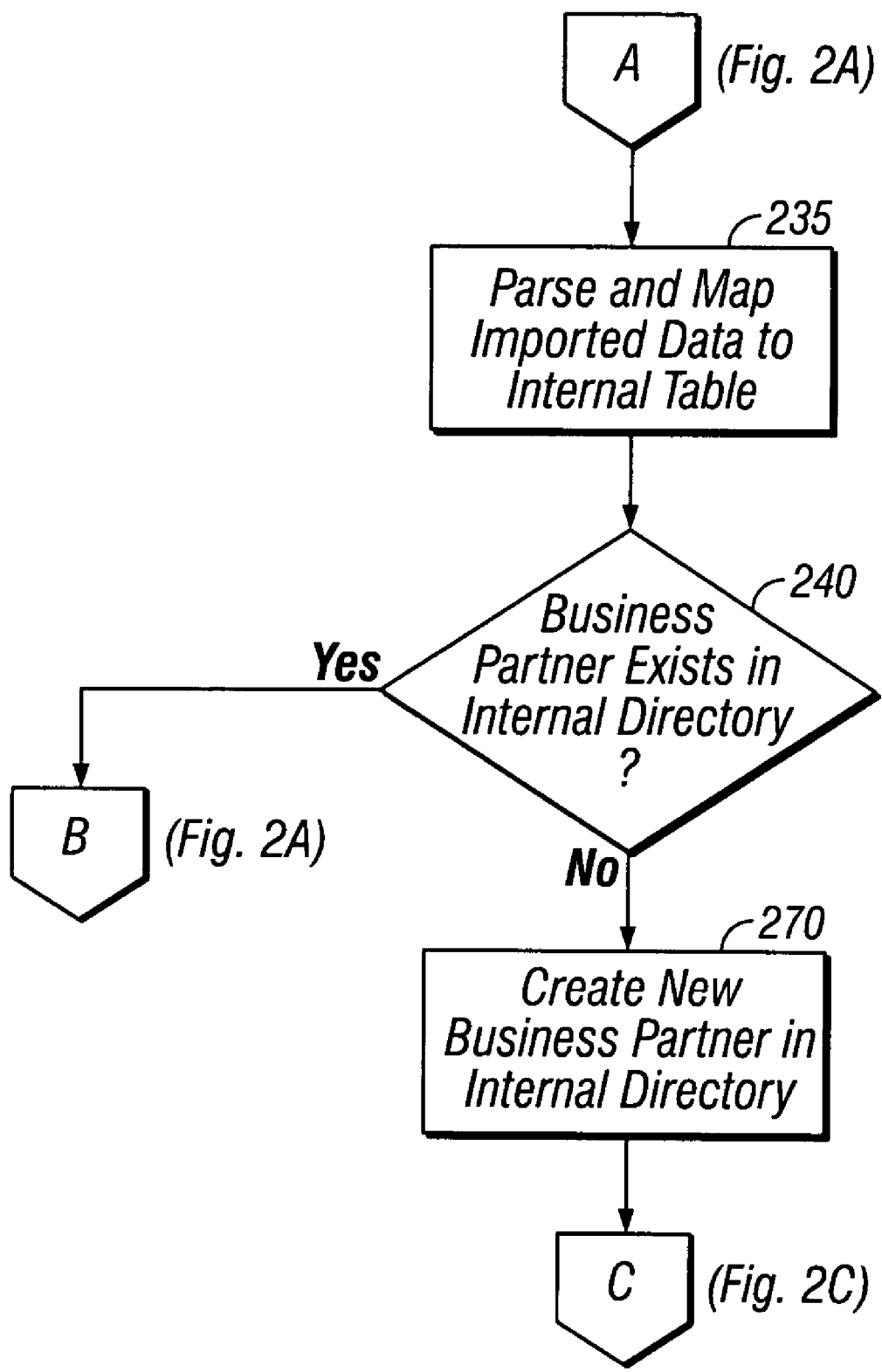
Figure 2C:
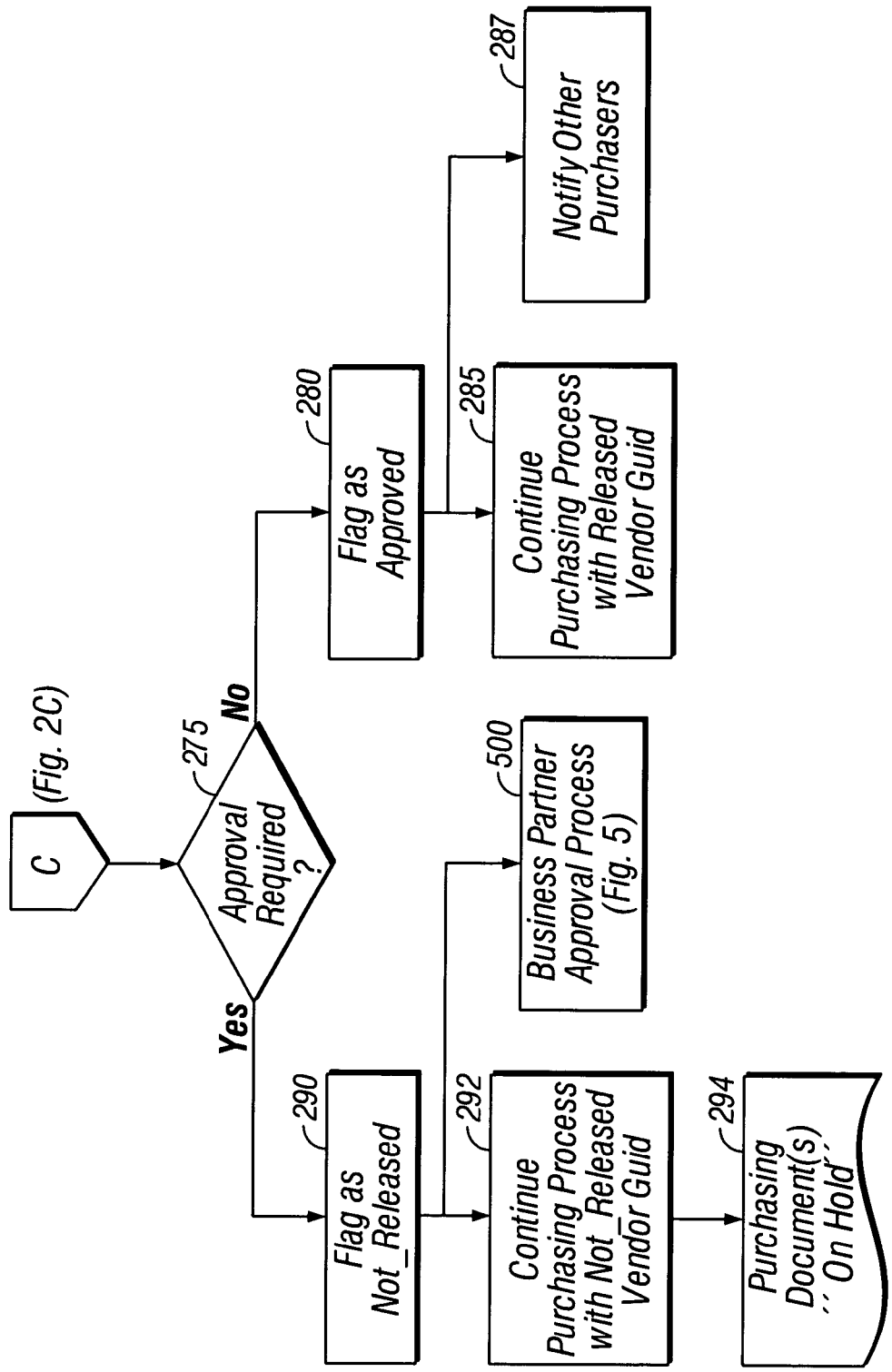

In an embodiment, the user can create a business partner, e.g., as an object in the internal directory 123, during execution of a business process in any of the services 120-122 provided by the procurement system. For example, FIGS. 2A-2C is a flowchart describing an exemplary business partner creation operation performed during a sourcing process in the source cockpit service 120.

Figure 3:
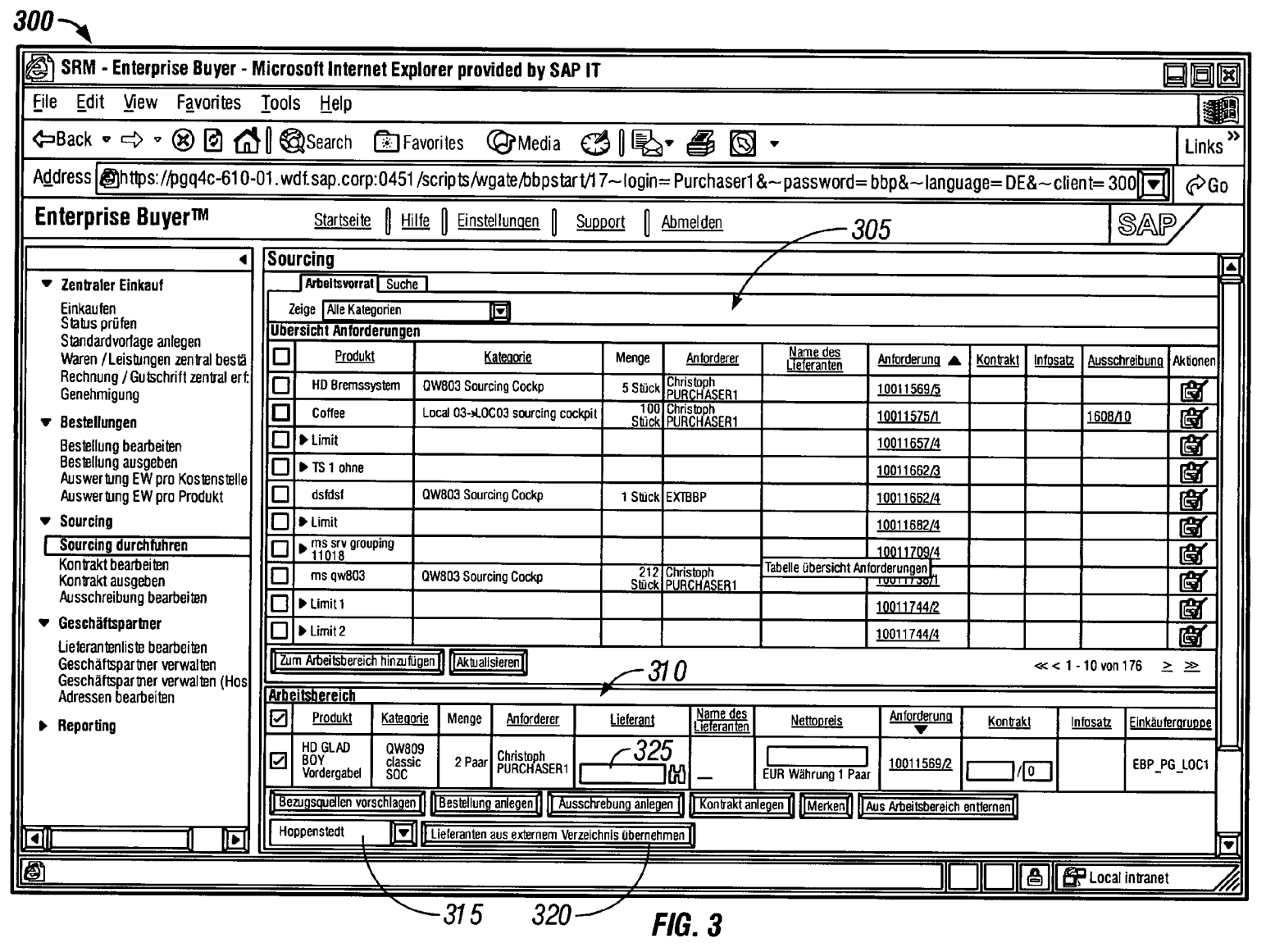

FIG. 3 shows an exemplary screen display 300 for the sourcing process. The screen display 300 includes a work list 305 including descriptions of products to source (work items), a work area 310, a pull down menu 315, and an external services link button 320 to call external web services. In an embodiment, the user can select an item from the work list 305 and pull it into the work area 310 (block 205) (FIG. 2A). The user may then select a business partner to source the product in the work item (block 210).

The work area 310 includes a field 325 for searching for a supplier from existing business partners in the electronic procurement system. The user may select from these existing business partners, e.g., by pulling up the internal direction 123 in a separate window and entering an existing business partner from the directory in the field 325. The user may also have the opportunity to select a new business partner from the external business partner directory 108. The procurement system 105 may provide one or more external service providers in the pull down menu 315. The user may select an external service provider from the pull down menu 315 and then press the external services link button 320 (block 215).

The enterprise system 106 may communicate with the external service provider 107 using a partner interface protocol. The partner interface may be, for example, the Open Partner Interface (OPI) developed by SAP AG of Waldorf, Germany.

The OPI uses standard Internet protocols, e.g., HTTP (Hypertext Transfer Protocol), to exchange information between the application server 109 and the external service providers. Using the OPI, the electronic procurement system 105 may send a request in an OPI-compliant format to an external service provider, and the external service provider may return a response page, which includes results compiled in response to the request, in an OPI-compliant format.

The OPI includes an outbound interface and an inbound interface. The outbound interface consists of information that is sent to the external service provider 107 by an OPI module 112 at the electronic procurement system 105. This information originates in the electronic procurement system 105, where it is created and maintained. The information may be stored in fields in an internal table. Every field may contain a name-value pair and have a type. The information stored in the table for each external service provider may include the following information: the external service provider URL (Uniform Resource Locator), which should refer to the location of the external partner directory; fields specific to the external service provider, such as username and password; and a return URL used by the external service provider 107 to return to the electronic procurement system 109.

Using the information in the internal table, the electronic procurement system 105 constructs a URL call to the external service provider and may redirect a web browser 130 at the client to this URL. In an embodiment, the external service provider may be accessed using the HTTP methods GET or POST, which includes the outbound interface field data. The external service provider 107 then parses and decodes this data and may perform a search of the external business partner directory 108 based on the data.

The OPI inbound interface consists of information that is sent to the electronic procurement system 105 by the external service provider 107. The inbound interface may be sent back to the electronic procurement system in an OPI-compliant form, e.g., an HTML page or an XML file. For each item selected in the external business partner directory 108 and sent to the electronic procurement system, all required fields must be sent, along with the optional fields. The fields may include the following information: name of the organization; language; address; telephone number; fax number; and e-mail address. FIG. 4 shows exemplary fields for an OPI inbound interface.

As described above, when the user selects an external business partner directory (block 215), the procurement system constructs the URL call to the external service provider and redirects the user's browser 130 to the external business partner directory. The directory may be opened in a separate window on the client display screen (block 220). The user may then select a new business partner (e.g., vendor) from the directory (block 225). The external service provider constructs a response form (e.g., HTML page) according to the partner interface protocol, which includes the required partner information in the appropriate fields, and sends the response page to the procurement system. The procurement system imports the data from the response page (block 230).

The procurement system may then parse and map the imported business partner data to an internal table (block 235)(FIG. 2B).

In an embodiment, when a business partner (e.g., a vendor) is selected from an external business partner directory, the procurement system may determine if the business partner already exists in the internal business partner directory 123 to prevent double entries (block 240). The check may be a string comparison or fuzzy search of the vendor's name with entries in the internal directory 123. As described above, business partners in the internal business partner directory may be flagged as "released" (approved) or "not_released". If the vendor does exist in the internal directory, the system may determine if the vendor is approved (block 250)(FIG. 2A). If the vendor is approved, the user may continue with the purchasing process using the released vendor guid ("globally unique identifier") in the internal directory (block 255). If the vendor is not approved, the user may continue the purchasing process with the not_released vendor guid (block 260). Any purchasing documents (e.g., a purchase order) generated in the purchasing process using the not_released vendor guid may be placed "on hold" in the system (block 265). The purchasing document will remain on hold until approved by an authorized approver, e.g., a manager of the purchasing organization.

If the vendor does not exist (block 240, FIG. 2B), the OPI information in the internal table may be used to create a new business partner entry (or object) in the internal business partner directory and assign a "not_released" vendor guid to the new business partner (block 270). The not_released status may indicate that the associated business partner entry is incomplete and/or unapproved.

The user may or may not have authority to create a business partner. This authority may be based on the user's role. A professional purchaser would probably have authority to create a business partner, whereas other users of the system may not. The procurement system determines whether approval is required (block 275)(FIG. 2C), e.g., by checking the role associated with the user. If approval is not required, the new business partner may be flagged as released in the internal business partner directory (block 280), and the user may then continue with the purchasing process with the released vendor guid (block 285). Other purchasers in the relevant purchasing group may also be notified of the new approved vendor, e.g., by email notification (block 287).

If approval is required, the new business partner may be flagged as a not_released (block 290). The user may then continue with the purchasing process with the not_released vendor guid (block 292). Any purchasing documents generated in the purchasing process using the not_released vendor guid may be placed on hold in the system (block 294).

Figure 5:
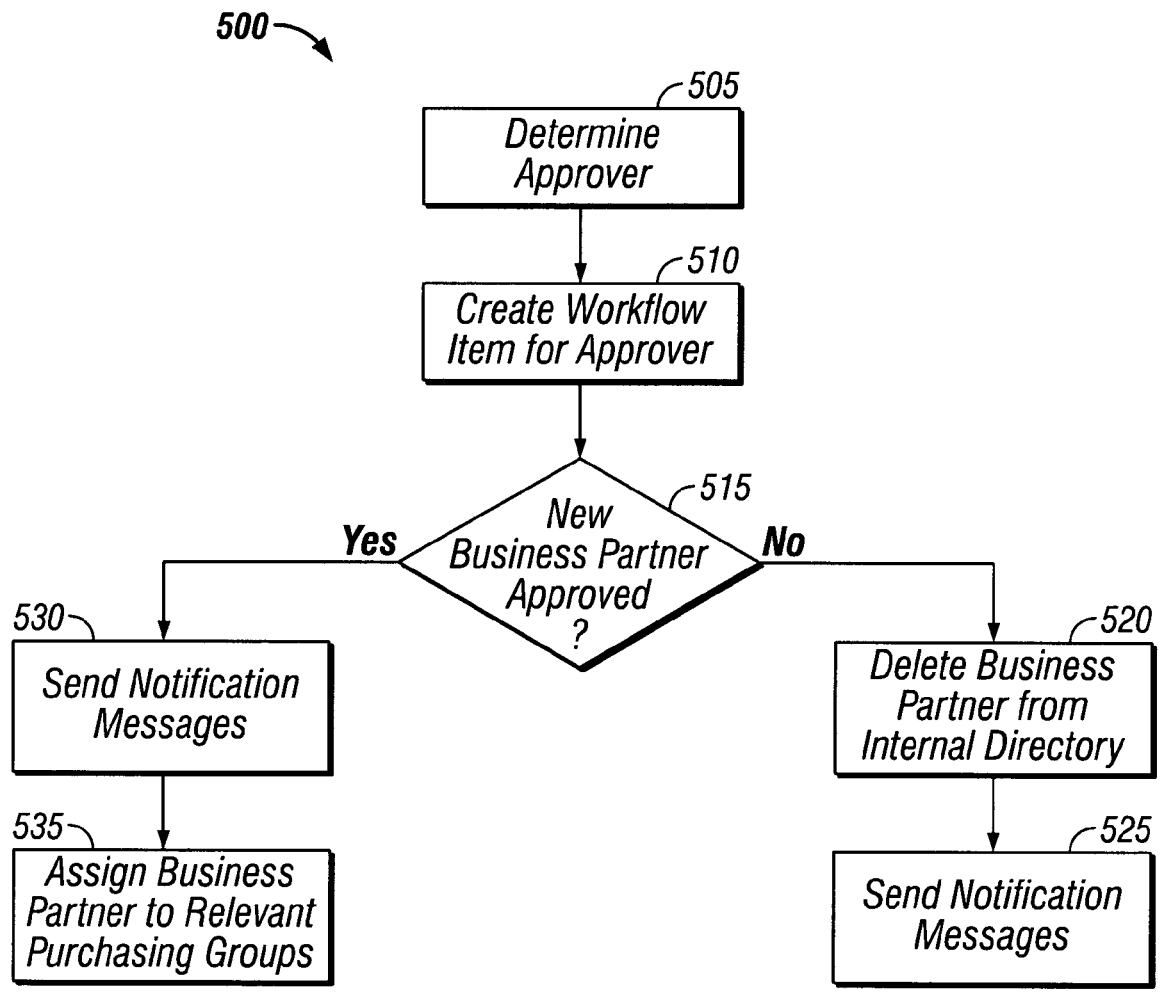
FIG. 5 shows a flowchart describing a business partner approval process.

The creation of the new, not_released business partner, may trigger a business partner approval process 500. FIG. 5 is a flowchart describing a process 500 for approving a new business partner. The procurement system may determine an approver in response to the creation of the new, not_released business partner (block 505). The approver may be, e.g., the manager of the purchase organization to which the user belongs. The system may then create a workflow item with the vendor guid in the approver's inbox (block 510). When the approver opens the workflow item, the business partner maintenance service may be launched in a new transaction window. The approver may then approve or reject the new business partner (block 515).

If the vendor is rejected, the system may delete the business partner from the internal directory, and any other business partner sets in the procurement system, that contain the rejected business partner (520). The procurement system may then send notification emails to the user and any other purchasers that have created purchase orders using the rejected business partner and to the business partner indicating the rejected status (block 525). The concerned procurement documents may remain in work lists with the "on hold" for further consideration or appeal.

If the business partner is approved, the system may send notification e-mails to the user and other purchasers that have created purchasing orders with the approved business partner (block 530) and the new business partner may then be assigned to relevant purchasing orders (535).

In an embodiment, the external business partner directory 105 may include more detailed information about a business partner in the internal directory 123. The user may be able to access this additional information during a business process through the OPI interface.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A computer-implemented method of integrating a new source of supply into an electronic purchasing process, the method comprising:
    initiating an electronic purchasing process on a purchasing computing system having an internal business partner directory of suppliers and information related to the suppliers, wherein the internal business partner directory is hosted by a service provider of the purchasing computing system;
    providing, as part of the initiated electronic purchasing process, a sourcing graphical user interface on a display device of the purchasing computing system, the sourcing graphical user interface having a first user entry area to enter, as a source of supply in the electronic purchasing process, a supplier included in the internal business partner directory, the sourcing graphical user interface further having a second area to initiate a search for additional suppliers not included in the internal business partner directory, the second area including a user-selectable listing of at least one external business partner directory of suppliers wherein each of the listed at least one external business partner directory is user selectable, each of the at least one external business partner directory being hosted by an external service provider that is not the service provider of the purchasing computing system and the internal business partner directory;
    receiving a user selection of one of the listed at least one external business partner directory, and upon receiving the user selection, establishing electronic communication, by the purchasing computing system, with the selected external business partner directory, and receiving information from the selected external business partner directory to provide, on the display device of the purchasing computing system, a display of a directory of the suppliers in the selected external business partner directory;
    receiving, at the purchasing computing system, a user selection of one of the suppliers included in the selected external business partner directory, sending an electronic request from the purchasing computing system and to the selected external business partner directory, the electronic request identifying the selected supplier, and in response receiving an electronic response that includes predefined required information to create in the internal business partner directory a business partner entry for the selected supplier;
    creating, using the information from the electronic response, a new business partner entry in the internal business partner directory, the new business partner entry for the selected supplier;
    determining whether a user who initiated and is controlling the electronic purchasing process has authority to approve the new business partner entry;
    responsive to a determination that approval is not required, identifying the new business partner as authorized in the internal business partner directory, and allowing the user to continue with the electronic purchasing process with the selected supplier as a source of supply; and
    responsive to a determination that the user does not have said authority, determining an authorized approver for the business partner entry, initiating an approval workflow item for the authorized approver, and putting the electronic purchasing process on hold.

2. The method of claim 1, wherein said creating of the new business partner entry comprises mapping parsed information from the electronic response into fields according to a partner interface protocol.

3. The method of claim 1, wherein the information received from the selected external business partner directory comprises an HTML page.

4. The method of claim 1, wherein the information received from the selected external business partner directory comprises an XML page.

5. The method of claim 1, wherein the electronic purchasing process requires a supplier business partner.

6. The method of claim 5, further comprising:
    completing the electronic purchasing process with the new business partner entry.

7. The method of claim 6, further comprising generating a purchase order using the new business partner entry.

8. The method of claim 1, further comprising:
    flagging the new business partner entry as incomplete in response to determining the user does not have said authority.

9. The method of claim 8, further comprising:
    generating a purchasing document with said new business partner entry; and
    flagging the purchasing document as on hold.

10. The method of claim 1, further comprising:
    deleting the new business partner entry from the internal directory in response to the authorized approver not approving the new business partner entry.

11. A computing system comprising:
    an internal business partner directory including information relating to a plurality of suppliers;
    a network device; and
    an electronic procurement computing system hosted by a service provider that also hosts the internal business partner directory, the electronic procurement system operative to:
        initiate an electronic purchasing process on the electronic procurement system;
        provide, as part of the initiated electronic purchasing process, a sourcing graphical user interface on a display device of the electronic purchasing computing system, the sourcing graphical user interface having a first user entry area to enter, as a source of supply in the electronic purchasing process, a supplier included in the internal business partner directory, the sourcing graphical user interface further having a second area to initiate a search for additional suppliers not included in the internal business partner directory, the second area including a user-selectable listing of at least one external business partner directory, wherein each of the listed at least one external business partner directory is user selectable;

receive a user selection of one of the listed at least one external business partner directory, and upon receiving the user selection, establish electronic communication with the selected external business partner directory, and receive information from the selected external business partner directory to provide, on the display device of the purchasing computing system, a display of a directory of the suppliers in the selected external business partner directory;

upon receiving a user selection of one of the suppliers included in the selected external business partner directory, send an electronic request to the selected external business partner directory, the electronic request identifying the selected supplier, and in response receive an electronic response that includes predefined information to create in the internal business partner directory a business partner entry for the selected supplier;

create, using the information from the electronic response, a new business partner entry in the internal business partner directory, the new business partner entry for the selected supplier; and determine whether a user who initiated and is controlling the electronic purchasing process has authority to approve the new business partner entry;

responsive to a determination that approval is not required, identify the new business partner as authorized in the internal business partner directory, and allow the user to continue with the electronic purchasing process with the selected supplier as a source of supply; and responsive to a determination that the user does not have said authority, determine an authorized approver for the business partner entry, initiate an approval workflow item for the authorized approver and put the electronic purchasing process on hold.

12. The computing system of claim 11, wherein the electronic procurement computing system is further operative to map parsed information from the electronic response into fields according to a partner interface protocol.

13. The computing system of claim 11, wherein the information received from the selected external business partner directory comprises an HTML page.

14. The computing system of claim 11, wherein the information received from the selected external business partner directory comprises an XML page.

15. The computing system of claim 11, wherein the electronic purchasing process requires a supplier business partner.

16. The computing system of claim 15, wherein the electronic procurement computing system is further operative to:
complete the electronic purchasing process with the new business partner entry.

17. The computing system of claim 16, wherein the electronic procurement system is further operative to:
generate a purchase order using the new business partner entry.

18. The computing system of claim 11, wherein the electronic procurement computing system is further operative to:
flag the new business partner entry as incomplete in response to determining the user does not have said authority.

19. The computing system of claim 18, wherein the electronic procurement computing system is further operative to:
generate a purchasing document with said new business partner entry; and
flag the purchasing document as on hold.

20. The computing system of claim 11, wherein the electronic procurement computing system is further operative to:
delete the new business partner entry from the internal business partner directory in response to the authorized approver not approving the new business partner entry.

* * * * *